D. ROWE.
Preserving Corn.
No. 17,697.	Patented June 30, 1857.
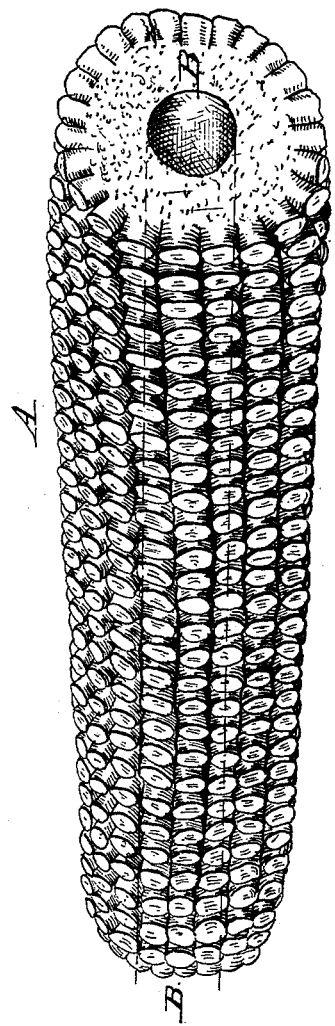

UNITED STATES PATENT OFFICE.

DAVID ROWE, OF NEAR LONG GREEN, MARYLAND.

MODE OF PRESERVING GREEN CORN.

Specification of Letters Patent No. 17,697, dated June 30, 1857.

*To all whom it may concern:*

Be it known that I, DAVID ROWE, of the county of Baltimore and State of Maryland, have discovered and invented a new and Improved Mode or Process of Preserving Green Corn in the Ear; and I do hereby declare that the following is a full and exact description thereof, reference being had to the accompanying drawings and to the letters of reference marked thereon.

The nature of my invention consists in extracting the heart or pith of the cob, for the purpose of seasoning and drying the inside and preventing it from collecting mold or corrupting.

To enable others skilled in the art to use my discovery and invention I will proceed to describe my mode and process of operating.

A represents the cob and green corn in the ear, and B the hollow aperture or passage through it, from which the pith or heart has been extracted.

I pluck the ear of corn from the stalk, when it is in its green state, barely fit for eating, as when commonly called, "scarcely ripe enough for roasting ears or boiling." I then extract the center (commonly called the pith or heart) of the ear, by cutting, boring or punching out the heart the whole length of the ear, so that the ear or cob, with the grain or corn on, has a tubular appearance, a perfectly hollow passage or aperture (through the cob) of any diameter from a $\frac{1}{2}$ inch to an inch in width, and in this hollow passage I sprinkle a teaspoonful of fine salt or pulverized loaf sugar.

I do not confine myself to any peculiar kind of knife, boring implement, or punch, by which the cob may be made hollow, but after the green cob has been hollowed out (which is easily done while in its green state) I season the inside as aforesaid, and hang the ears up, or lay them upon frame work, in a warm dry apartment or oven, so that dry or heated air is made to pass freely through the hollow passage B, in the cob or ear A, which dries the cob so rapidly, that the cob and grain upon it do not become corrupt or gather mold; and by this process I dry the inside of the cob as rapidly as the outside. After the ear of corn has thus become thoroughly dried, I have, by this process retained all the sweetness and milk of the grain, in the grain itself, and having extracted the heart or pith, which always absorbs the strength or virtues of the grain, and which has always retained the greatest quantity of the moisture of the cob, and prevented it from drying, and the mold to collect and corrupt the grain, I have preserved all the virtues, juice and taste of the grain, so that by soaking it in cold water a few hours and then boiling it like green corn, it is fit for table use, and can be placed (in winter) on the table either in ears or shelled. It is fit for transportation or exportation, and in point of economy, it is thus dried and preserved, much cheaper for table use, than by any other process I know of.

What I claim as my discovery and desire to secure by Letters Patent, is—

The art and process of preserving green corn in the ear, by extracting the pith or heart of the cob, and seasoning and drying the inside of the cob as rapidly as the outside, for preserving the virtues and juice of the grain, and preventing the collection of mold or corruption, as herein described, and for the purposes set forth.

DAVID ROWE.

Witnesses:
M. CARPENTER,
GEORGE ALBRIGHT.